United States Patent

[11] 3,597,734

| [72] | Inventor | George A. Harris, Jr.<br>110 Lincoln Ave., Saddle Brook, N.J. 07663 |
|---|---|---|
| [21] | Appl. No. | 765,051 |
| [22] | Filed | Oct. 4, 1968 |
| [45] | Patented | Aug. 3, 1971 |

[54] SEQUENTIALLY OPERATED SYSTEM FOR AUTHENTICATING CREDIT CARDS
4 Claims, 20 Drawing Figs.

| [52] | U.S. Cl. | 340/149, 340/147 |
|---|---|---|
| [51] | Int. Cl. | H04g 3/00 |
| [50] | Field of Search | 340/149 A |

[56] References Cited
UNITED STATES PATENTS

| 3,154,761 | 10/1964 | O'Gorman | 340/149 A |
| 3,184,714 | 5/1965 | Brown, Jr. | 340/149 A |
| 3,221,304 | 11/1965 | Enikeieff | 340/149 A |
| 3,430,200 | 2/1969 | Barney | 340/149 A |
| 3,450,953 | 6/1969 | Gardner | 340/149 A |
| 3,299,298 | 1/1967 | Schinner | 340/149 A |

Primary Examiner—Harold I. Pitts
Attorney—Donald P. Gillette

ABSTRACT: A system for authenticating credit cards wherein the card contains a hidden code and is coded by means of irregularities in the card's surface. The card is inserted in the reader which is provided with a plurality of keys. When the code is punched in the correct order on the keys so that it corresponds with the hidden code contained on the card irregularities, circuits in the reader close and an indication that the card is in the hands of one having knowledge of the hidden code is displayed. This display can be by means of a light or by means of actuation of the print roller contained in the reader or both.

PATENTED AUG 3 1971

3,597,734

INVENTOR.
GEORGE A. HARRIS, JR.
BY
Gennelson & Jacob
his attorneys

INVENTOR.
GEORGE A. HARRIS, JR.

SEQUENTIALLY OPERATED SYSTEM FOR AUTHENTICATING CREDIT CARDS

The invention relates to a system for authenticating credit cards and in particular to such a system wherein there are at least two possible code groups which must be authenticated in the proper order. Each of the code groups contains a plurality of possible individual authentication elements.

With the phenomenal growth of the use of credit cards for all manner of purchases and identification and with the advent of loss and pilferage of credit cards, it becomes very important for the cardholder and the establishment in which card charging is used to be protected against use of the card by unauthorized persons.

Accordingly, it is an important object of the invention to provide a system for authenticating credit cards which is simple to use at the point of sale.

It is a further object of the invention to provide such a system wherein there are at least two code groups each of which must be authenticated and which must be authenticated in the proper order.

It is a still further object of the invention to provide such a system wherein there are a relay associated with each code group, irregularities on the card surface which actuate at least one switch in each code group and a plurality of switches on the reader. The relay of the first code group closes when the card is inserted in the reader and the correct switch in the reader is closed first. The relay of the second group closes only if the first code group relay is closed and the correct reader switch is closed second and so on.

It is a still further object of the invention to provide such a system wherein the irregularities in the surface of the card are along the edges of the card.

It is a still further object of the invention to provide such a system wherein the irregularities in the card are embossments above the surface of the card.

It is a still further object of the invention to provide such a system wherein the irregularities in the card are depressions in the surface of the card.

It is a still further object of the invention to provide such a system wherein the irregularities in the card are holes therein.

These and other objects, advantages, features and uses will be apparent during the course of the following description when taken in conjunction with the accompanying drawings.

Broadly, the invention is directed toward a system for authenticating credit cards which utilize a code contained on the card which must be matched by putting the authenticating code into the reader in the proper order. When the first code group is authenticated, a relay associated with the first code group closes and permits the second group relay to close if the second group is properly authenticated. Each subsequent code group relay will only close if all the previous code group relays are closed.

The card code is contained in irregularities in the cards which close card switches in each of the code groups and hand-actuated switches on the reader keyboard close reader switches each of which is connected in series with an associated card switch. When both associated switches are closed, the code group relay closes if all the previous code groups relays have closed.

The card irregularities may be either raised embossments, surface depressions or holes in the card. For aesthetic reasons, these irregularities are along the card edges and if the edges of the average 3¼inches ×2⅛inches credit card are used, it is possible to place 200 such irregularities therealong. Any number of code groups may be employed but it has been found that the average individual can remember a random group of three alpha and a single digit or a random group of three alpha and two digits relatively easily but some difficulty is encountered when longer random groups are used.

When all the code group relays are closed, a display such as a green light indicates that the card is authentic. If the code inserted in the reader is not correct, a red light or similar display indicates that the card is not valid. Some systems of the invention include a printing motor which is actuated only when a card is authenticated.

There are 175,760 code combinations in the reader when a three alpha-single digit code is used and 1,757,600 code combinations in the reader when a three alpha-two digit code is used. Since the average card contains about 200 code positions, a three alpha-single digit code could contain 5,823,125 code combinations (55 positions for the three alpha code groups and 35 positions for the single digit code group). In a three alpha-two digit code in which there are 50 positions on the card for the three alpha code groups and 25 positions on the card for the two digit code groups, there would be 78,125,000 code combinations.

In the accompanying drawings, forming a part of this application, and in which like numerals are employed to designate like parts throughout the same;

Figure 1:
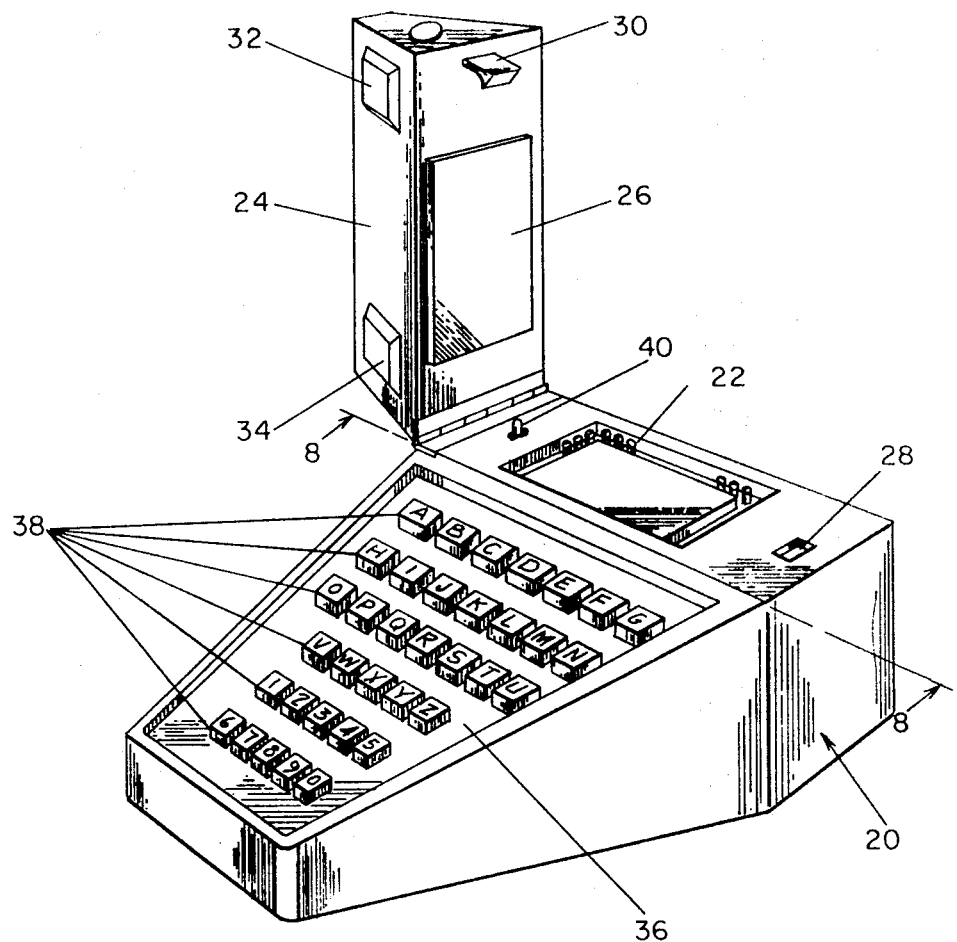
FIG. 1 is a perspective view of a reader used in the system of the invention in the open position, without a card in the reader.

In the drawings, wherein, for the purpose of illustration, are shown various embodiments of the invention, the numeral 20 designates a reader utilized in the system of the invention. Reader 20 (FIG. 1) is seen to comprise card receptacle 22, hinged cover 24 which is provided with platen 26 which presses down on the card when the card is in place in receptacle 22 and the cover is closed. When cover 24 is in its down position, latch 30 is engaged in latch aperture 28 and the cover is held in place thereby. When cover 24 is in its down position, normally open switch 40 is closed so that the authentication system is ready to operate.

Keyboard 36 is provided with code keys 38 whose uses will be described further on in this specification. Indicators 32 and 34 are utilized to display a signal which shows whether or not the card has been properly authenticated.

Reader-printer 20A (FIG. 2) is similar to reader 20 of FIG. 1 and in addition to the authenticating elements of reader 20 is also provided with a print roller 44 which presses the invoice sheet (not shown) against the card 42. Print roller 44 is manually operated by means of handle 46. The cashier will normally not print the invoice until the card is authenticated. In fact, the invoice need not be inserted until the card is authenticated.

Figure 2:
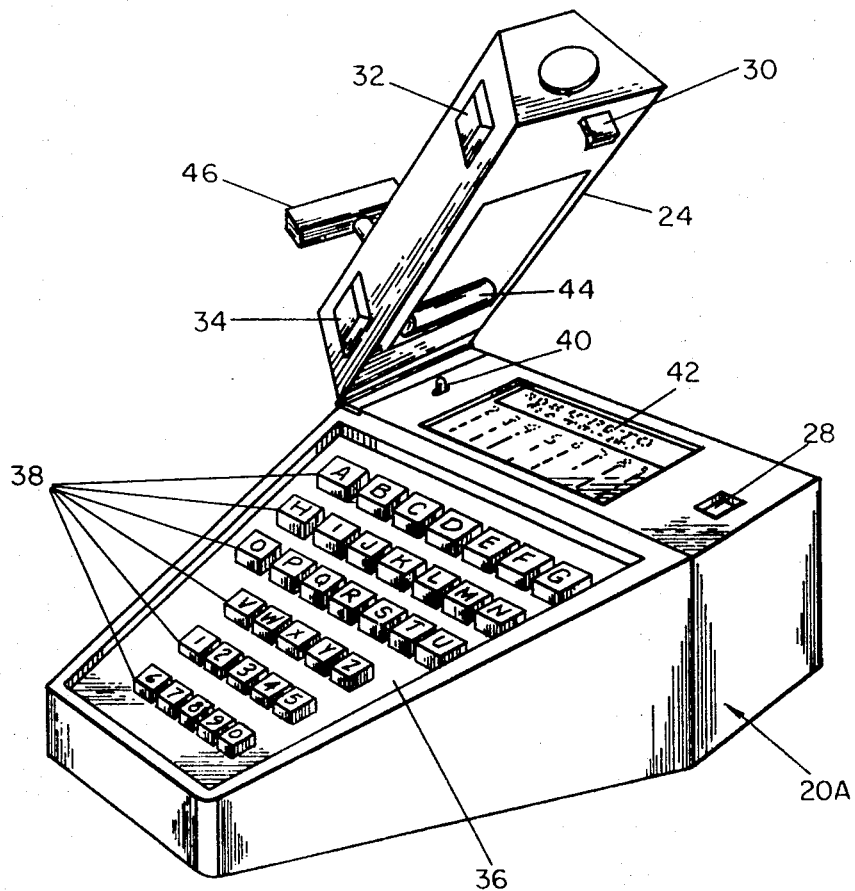
FIG. 2 is a view similar to that of FIG. 1 of a reader of the invention in combination with a hand-actuated printer with a card inserted in the reader.
Figure 3:
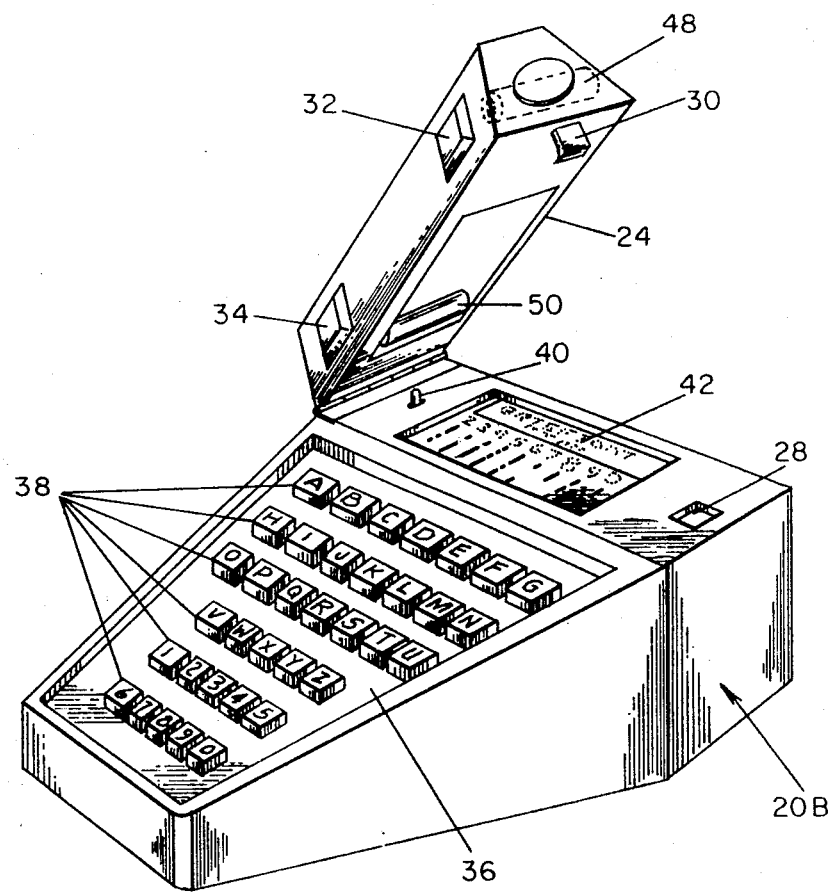
FIG. 3 is a view similar to that of FIG. 1 of a reader of the invention with a motor-driven printer with a card inserted in the reader.

Reader-printer 20B of FIG. 3 is provided with the same authenticating system as those of FIGS. 1 and 2 and is also provided with motor 48 and print roller 50. The card 42 is placed in the card receptacle, the invoice is placed on the card and the cover 24 is closed to its down position. If the card is authenticated, the motor will turn on and the print roller 50 will traverse the card and invoice to thereby print the invoice automatically.

The system of the invention requires that the card be coded by some type of surface irregularities which may be sensed by a feeler pin which actuates a switch. When the correct switches in the reader are actuated by the keys on the keyboard, the authentication circuits will close and a "good" indication will be displayed. If the correct code is not actuated on the keyboard, a "bad" indication will be displayed. The surface irregularities may be above the surface (projections or dimples) or below the surface (depressions or holes).

Figure 4:
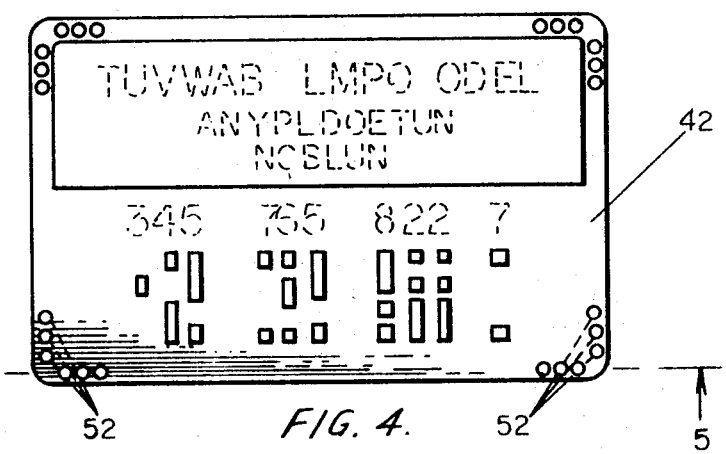
FIG. 4 is a plan view of a credit card of the invention wherein the code is contained in a raised dimple on a surface of the card.
Figure 5:
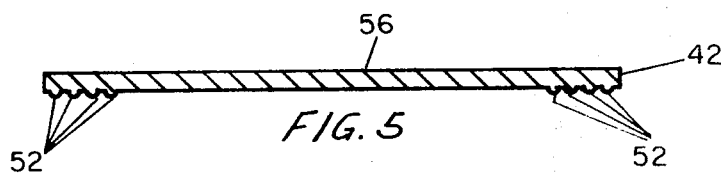
FIG. 5 is a sectional view, taken along the lines 5–5 of FIG. 4, viewed in the direction of the arrows.
Figure 5A:
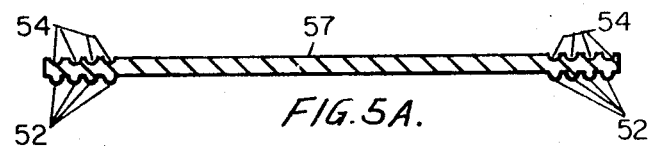
FIG. 5A is a view similar to that of the FIG. 5 of a modified version of card utilized in the system of the invention.

In FIG. 4, there is illustrated card 42 which is provided with projections or dimples 52. These dimples 52 may be formed by molding the card so that the surface 56 opposite the raised dimples 52 is smooth as shown in FIG. 5. On other other hand, the card projections 52 may be formed by embossing techniques in which case, the surface 57 opposite that containing the projections 52 will contain complementary depressions 54 as shown in FIG. 5A.

Figure 6:
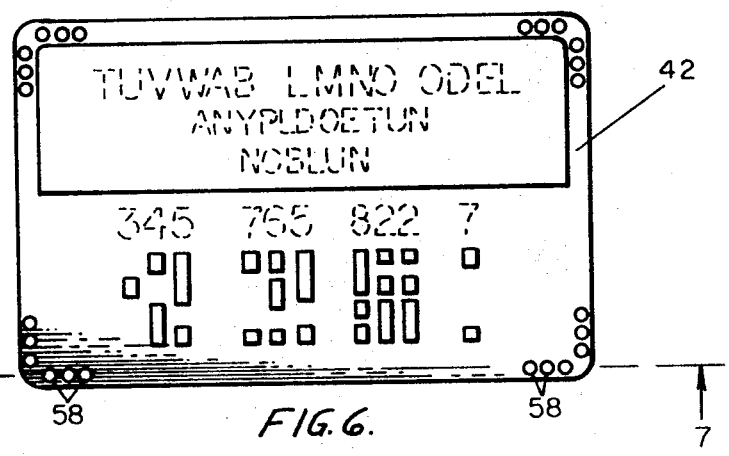
FIG. 6 is a plan view of a credit card of the invention wherein the code is contained in a depression or hole in a surface of the card.
Figure 7:
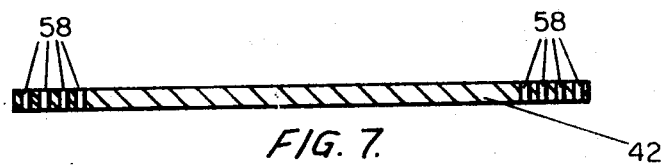
FIG. 7 is a sectional view, taken along the line 7–7 of FIG. 6, viewed in the direction of the arrows.
Figure 7A:
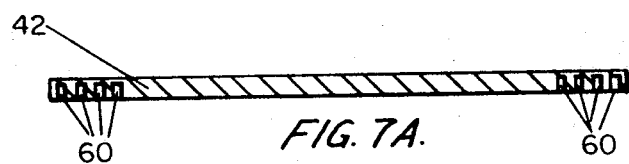
FIG. 7A is a view similar to that of FIG. 7 of a modified version of card utilized in the system of the invention.

Card 42 of FIG. 6 utilizes holes or depressions as the surface irregularities to carry the code. Holes 58 are formed in card 42 by drilling or punching through the card. Depressions 60 are formed by drilling or punching part way through the card. It is also possible to produce the depressions by embossing techniques in which case the depressions of FIG. 5A may be used as the code-carrying elements.

Figure 8:
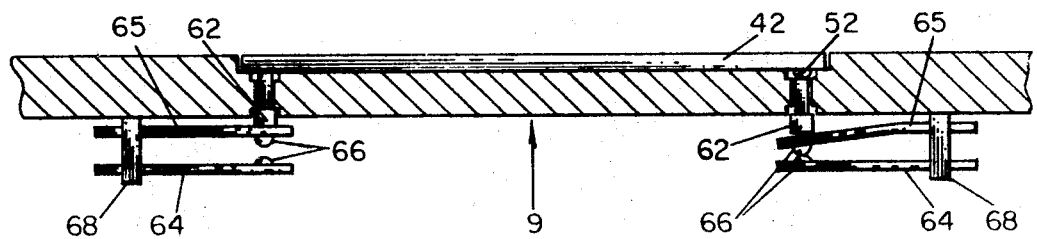
FIG. 8 is an enlarged, sectional view, taken along the lines 8–8 of FIG. 1, viewed in the direction of the arrows, showing the reader switches used with a card having dimples or outward embossments.
Figure 9:
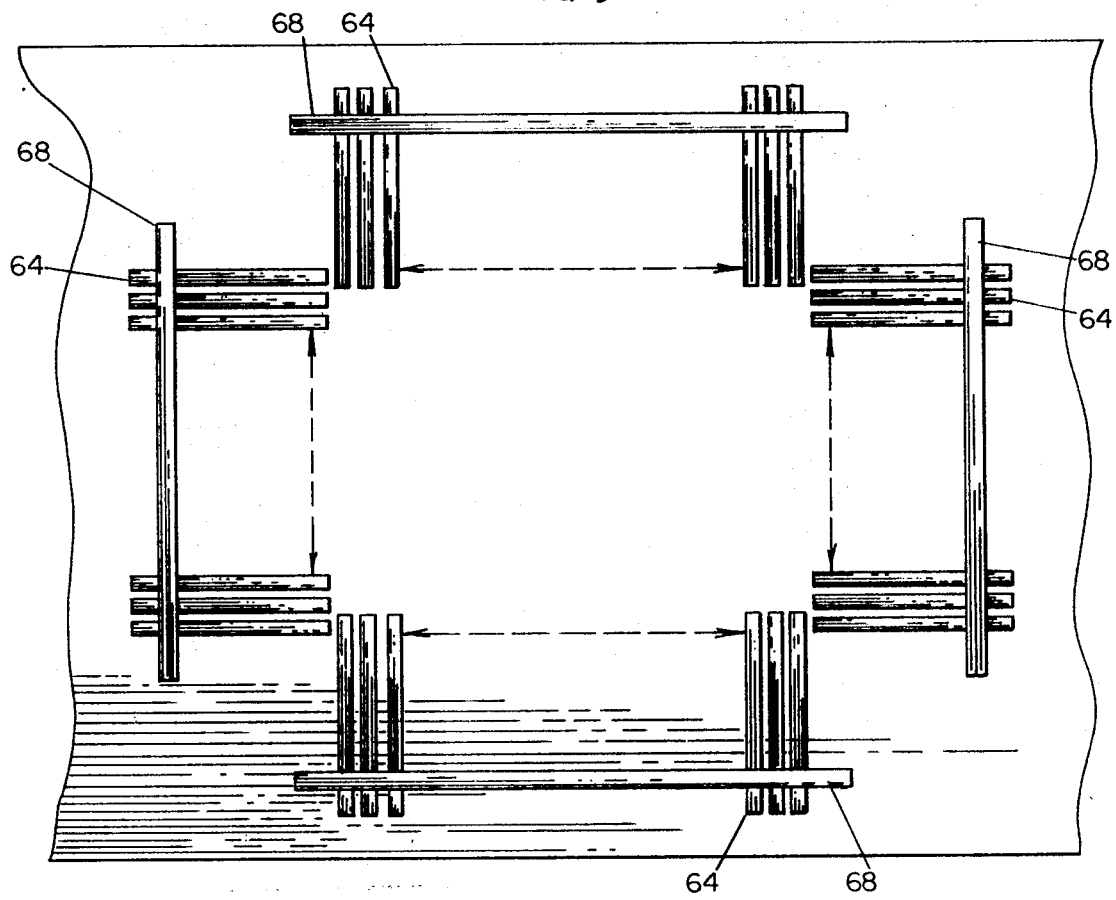
FIG. 9 is a bottom, plan view, viewed in the direction of arrow 9 of FIG. 8.

FIG. 8 is an enlarged view showing the card 42 inserted in the reader 20 which is set up for the detection of codes carried by dimples or projections 52. The switches 64 are mounted on bars 68 which are suitably mounted inside the reader (details not shown). Each switch 64 has associated with it a feeler pin 62 which senses the presence or absence of a projection 52. When there is a projection 52 in contact with the pin 62, the card pushes the pin against the upper contact arm 65 of switch 64 and the contacts 66 come into contact with each other. This condition is shown at the right of FIG. 8. When there is no dimple in contact with a particular pin 62, contact arm 65, which is resiliently biased to keep contacts 66 normally open, pushes against pin 52 and the contacts remain open. This condition is illustrated at the left side of FIG. 8.

Figure 10:
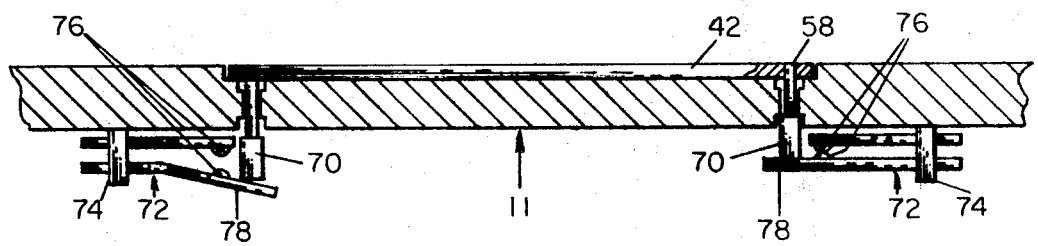
FIG. 10 is a view similar to that of FIG. 8 showing the reader switches used with a card having holes or depressions.
Figure 11:
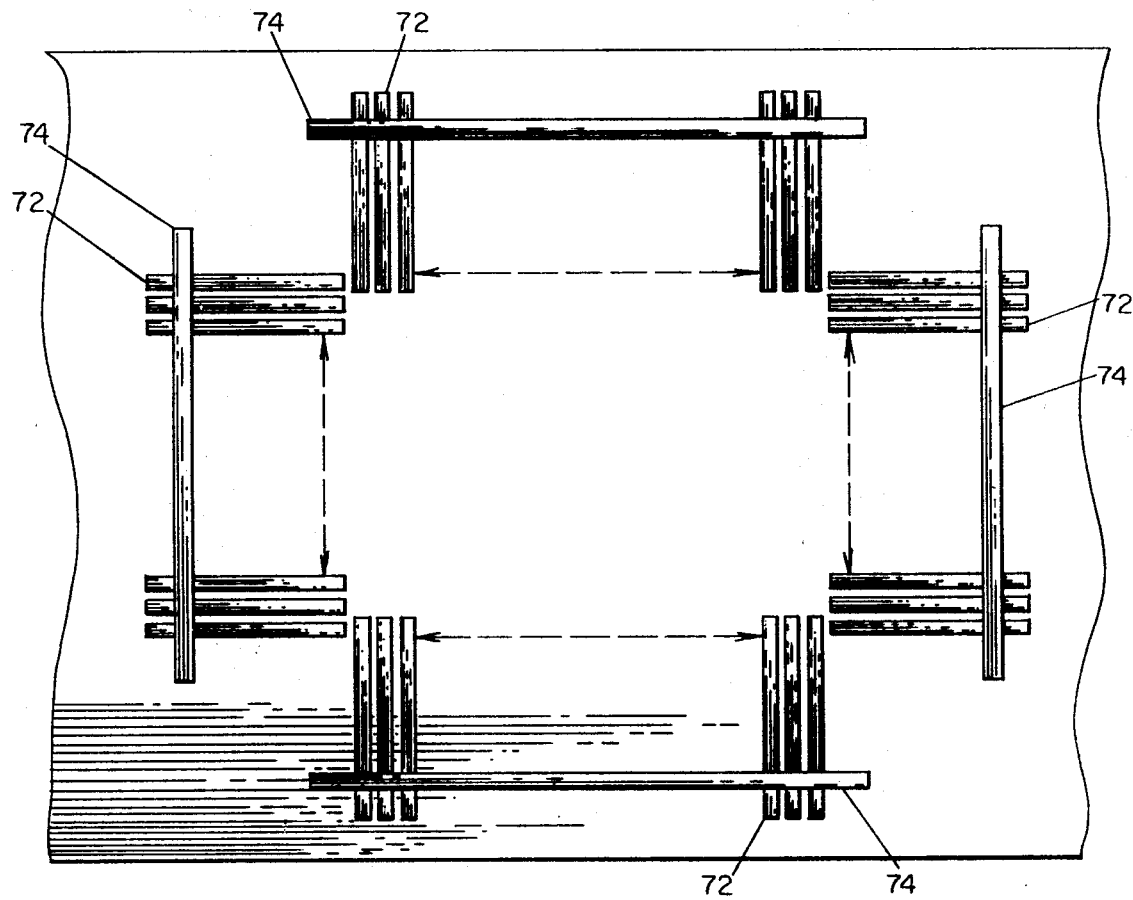
FIG. 11 is a bottom, plan view, viewed in the direction of arrow 11 of FIG. 10.

FIGS. 10 and 11 show a card 42 inserted in a reader equipped for detecting codes carried by holes 58. Switches 72 are normally closed and are mounted on bars 74 which are held in place within the reader. When a hole appears opposite a feeler pin 70, contact arm 78, which is resiliently biased to hold contacts 76 closed, pushes against pin 70 and the contacts 76 remain closed. This condition is illustrated at the right side of FIG. 10. If no hole 58 is present, feeler pin 70 is pushed down by card 42 so that it pushes contact arm 78 away from its normal position and the contacts 76 are opened. This condition is shown at the left side of FIG. 10.

Figure 12:
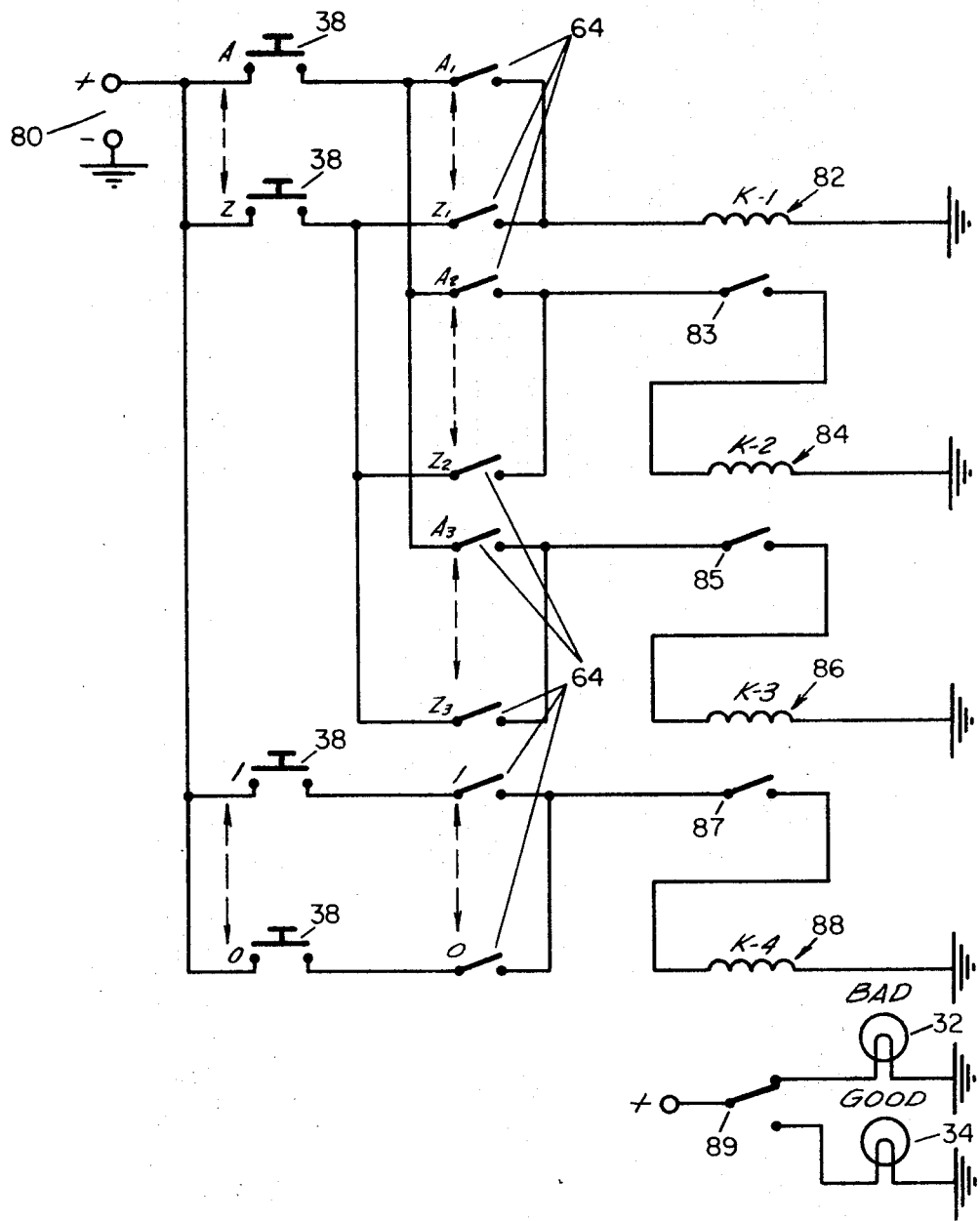
FIG. 12 is a simplified schematic diagram of a three alpha-single digit code system utilizing cards having raised surface irregularities or dimples as code indicators.

The simplified circuit of FIG. 12 shows a three alpha-single digit code system of the invention for use with cards having raised embossments or dimples. Source of power 80 may be one or more batteries or an AC rectifier power supply or the system may be AC operated. For simplicity and convenience, it it best to use batteries which are contained in the reader. This will permit the merchandiser to move the card reader to the customer's table and save the trouble of waiting in line at the cashier's desk. While the particular examples all use the three alpha-single code, it is obvious that other possible code groupings may be used with the same keyboard. Only the internal connections and the card coding need be changed to accomplish this purpose.

The simplified schematic of FIG. 12 does not show the holding circuits or the reset circuits, these will be described further on in this specification. Assume that the card is coded ACF3. The cardholder must remember this code and operate the appropriate keys 38 in the proper sequence to authenticate the card. Keyboard switch A is connected in series with all of the card switches A and with the appropriate relay coil for the several possible code groups. So that, key switch A, card switch A-1 and coil K-1 of relay 82 are connected in series with power source 80. Similarly, each other key switch is series connected with its associated card switch and the coil of relay 82 or the first code group.

In like manner, key switch A is connected in series with its associated card switch A-2 and coil K-2 of relay 84 for the second code group and with its associated card switch A-3 and coil K-3 of relay 86 for the third code group. The other key switches are similarly connected with their associated card switches and the appropriate relay coils.

In the particular system illustrated in FIG. 12, the alphabetical keys are connected to the first three code groups and the digit keys are connected to the fourth code group. A three alpha-single digit code could be changed so that the digit was for the second code group, for example, the code on a particular card could be A3CF. Then the alphabetical keys would be connected to the circuits containing the coils of the first, third and fourth relays and the digit keys would be connected to the circuit containing the coil of the second relay.

For simplicity, the holding coils are not shown in FIG. 12 but the previously closed switches must be held closed until all four switches are closed and the "Good" light 34 is lit. Taking the suggested coded card ACF3, the card is inserted in the reader and the cardholder punches the code ACF3 in that order on the keyboard. The card switches A-1, C-2, F-3 and 3 having been closed and as the cardholder punches key A, the circuit through relay coil K-1 of relay 82 closes. This closes switch 83 of relay 82 and it is held closed in a manner which will be described later. When key C is punched next, the circuit through key switch C, card switch C-2, relay switch 83 and coil K-2 of relay 84 is closed so that current flows in coil K-2 and switch 85 of relay 84 is closed.

Now, then key F is punched, the circuit through key switch F, card switch F-3, relay switch 85 and coil K-3 of relay 86 is closed so that current flows in coil K-3 and switch 87 of relay 86 is closed. Next, the digit 3 is pushed and the circuit is closed through key switch 3, card switch 3, relay switch 87 and coil K-4 of relay 88. This causes switch 89 of relay 88 to switch over so that the "Good" indicator 34 is connected to the source of power 80 and the display indicates that the card has been authenticated.

Figure 13:
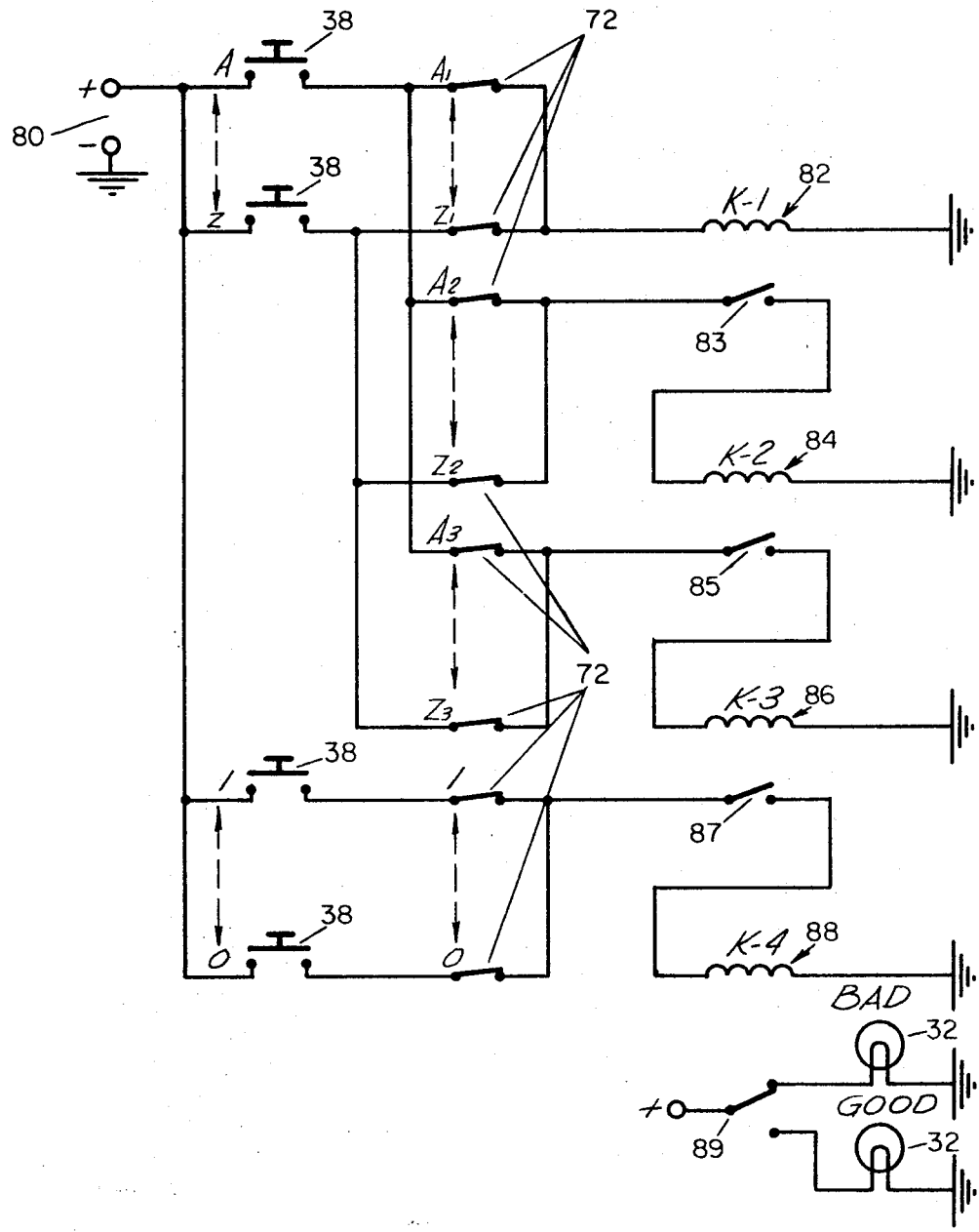
FIG. 13 is a simplified schematic diagram of a three alpha-single code system utilizing cards having holes or depressed surface irregularities as code indicators.

FIG. 13 illustrates the simplified circuit used when holes or depressions in the card carry the code. The figure shows the positions of switchs 72 (normally closed) when the card is not inserted in the reader. When the card is inserted in the reader, all the switches 72 open except for those which are permitted to remain closed because the feeler pin 70 (FIGS. 10 and 11) has entered the card hole or depression. Thereafter, the operation of the circuit and authentication operation of FIG. 13 with the card inserted is identical with that of FIG. 12 with the card inserted and described just above.

Figure 14:
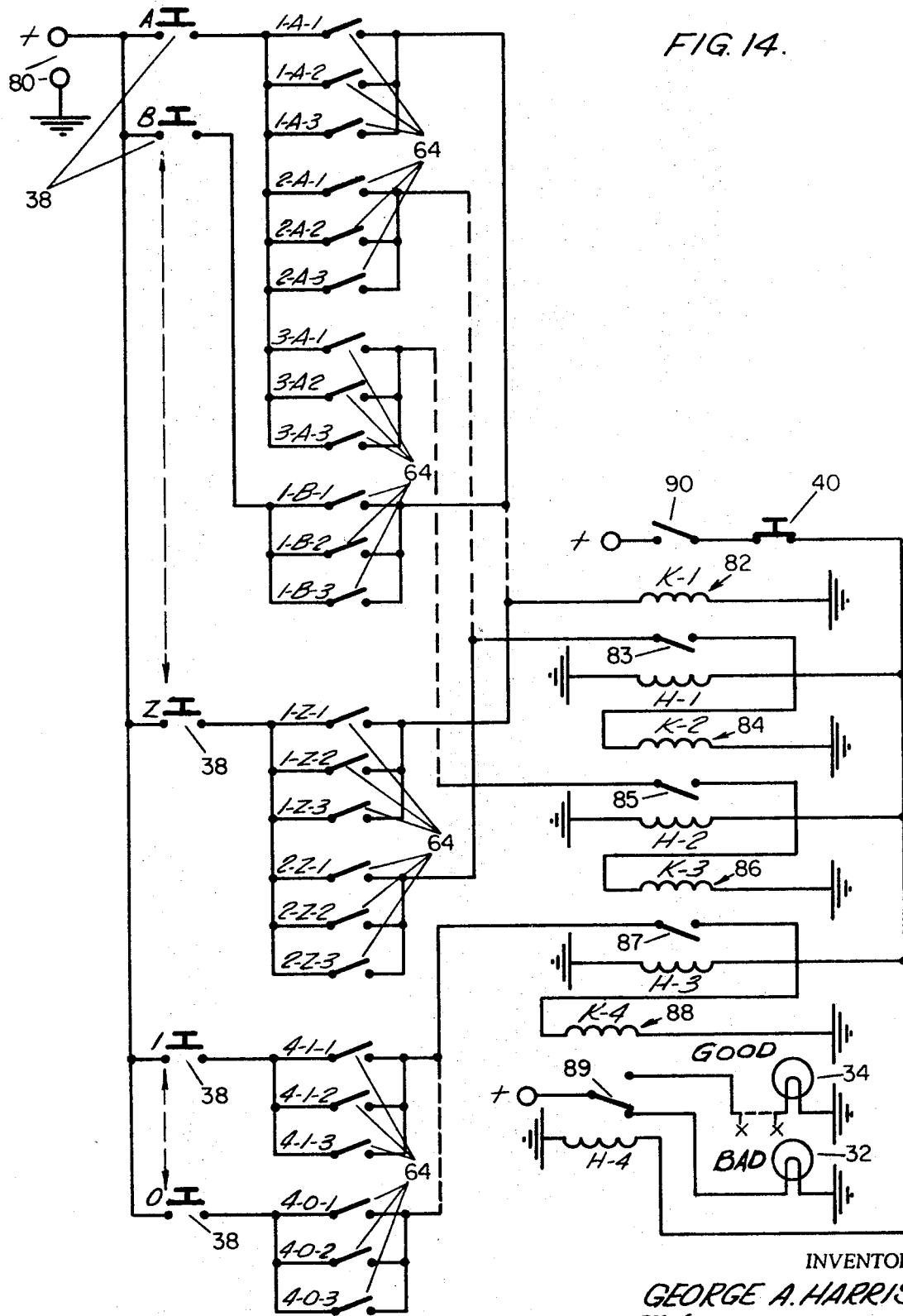
FIG. 14 is a detailed schematic diagram of the system of FIG. 12.

FIG. 14 is a detailed schematic diagram used with a three alpha-single digit code for cards wherein the code is carried by a dimple or projection from the card surface. The card is inserted in the reader so that the card switches 64 close. The legend on the card switch 64 of FIG. 14 has the following meaning: the left numeral indicates the code group, the central indicator (letter or digit) indicates the code unit and the right numeral indicates the position of the code unit on the card. Since on the average credit card, which is 3¼inches ×2⅛inches, it is possible to have 200 code positions and since a three alpha-single digit code utilizes only 88 code units, it can readily be seen that it is possible to have at least two positions in each code group for every code unit and have three positions for some of them.

This increases the flexibility of the system and improves its security because it is now possible to have the same card code on different positions on the card. It also makes it possible for a single reader to read different credit cards of various companies. For example, company A's cards may be coded in the first position, company B's cards in the second position and company C's cards in the first and third positions. The same reader will still be able to read and authenticate all three cards. This example can be extended considerably so that many different companies can use the same reader, the cardholder can use the same code for all his credit cards and still the cards will not have all their code indications the same.

One company could use position 1 for A through G and position 2 for H through Z in code group 1 and different combinations in the other code groups. Since the combinations can be chosen at random, it is easy to see that there is little likelihood of duplication while still permitting one reader to authenticate cards from a plurality of companies.

If the reader is of the type illustrated in FIG. 3, the motor 48 is connected between the points X of FIG. 14 so that it is in series with indicator 34.

Operation of the system of FIG. 14 for cards having dimples or projections on the surface thereof proceeds as follows: The card is inserted in the reader with its coded side down, the on-off switch 90 is turned on, the cover is closed, and the authentication code is punched into the keyboard. If the first letter is correct, the series circuit made up of the key switch, the card switch and coil K-1, of relay 82 is connected to source of power 80 and switch 83 closes. Now, since the keys 38 are spring biased, the switch 83 will open when the key is released unless means are provided to hold the switch 83 closed.

Holding coil H-1 is connected across source of voltage 80 whenever switch 90 is closed and the cover is closed. The magnetic field from coil H-1 is sufficient to hold switch 83 closed once it is closed due to the magnetic field from coil K-1. However, the magnetic field from coil H-1 alone is not sufficient to close switch 83. The magnetic field from coil H-1 biases switch 83 toward closing, does not close the switch alone and holds the switch closed once it is closed.

Now, the second code unit is actuated on the keyboard. If correct, the following series circuit is connected to the source of voltage 80: the key switch, the card switch, switch 83 and coil K-2 of relay 84. As a result, switch 85 closes and is held closed by holding coil H-2 of relay 84. If the next code unit is correctly punched on the keyboard, the circuit including the key switch, the card switch, switch 85 and coil K-3 of relay 86 is connected to the source of voltage 80 and the switch 87 of relay 86 closes. Switch 87 is held closed by holding coil H-3.

If the last code unit punched on the keyboard is correct, the closed, series circuit of the key switch, the card switch, switch 87 and coil K-4 of relay 88 is connected to the source of voltage and switch 89 of relay 88 closes. It is held closed as described above by holding coil H-4.

When switch 89 closes, "Good" indicator 34 is lighted and if motor 48 is connected as described heretofore, the invoice is printed.

If the incorrect code has been punched on the keys, the "-Bad" indication 32 will remain lit. Since the insertion of the incorrect code on the keyboard may have been accidental, the cover is opened so that reset switch 40 opens and all relay switches which may have closed are opened and the cardholder can start again.

Figure 15:
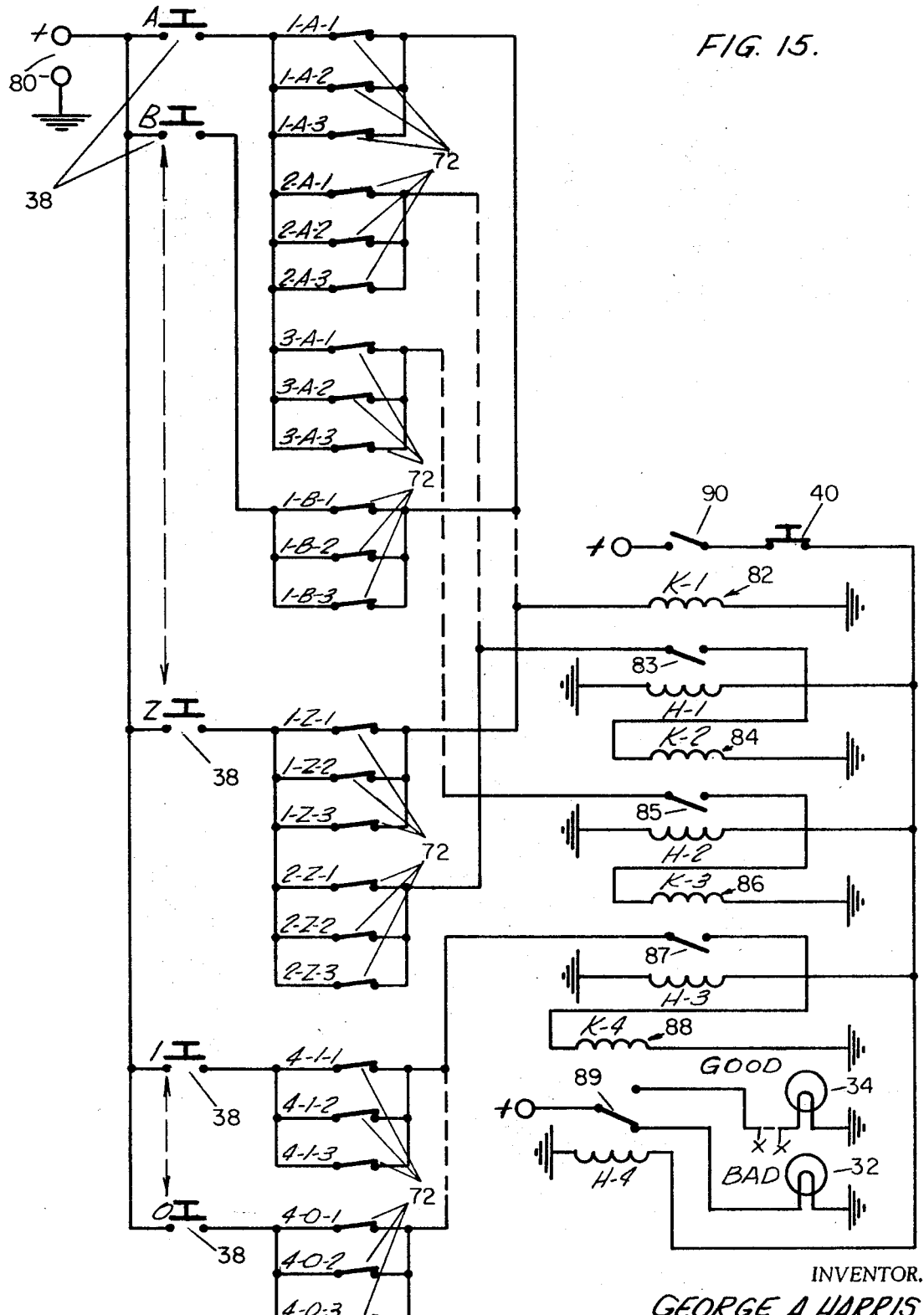
FIG. 15 is a detailed schematic diagram of the system of FIG. 13.

When a card having holes or depressions is inserted in the reader of FIG. 15, all the normally closed, card switches 72 are opened except those corresponding to a hole or depression in the card. The printing motor 48 is connected between points X if the reader is provided with an automatic printing motor.

The operation once the card is inserted in the reader of FIG. 15 is the same as that of FIG. 14 and will not be repeated.

Figure 16:
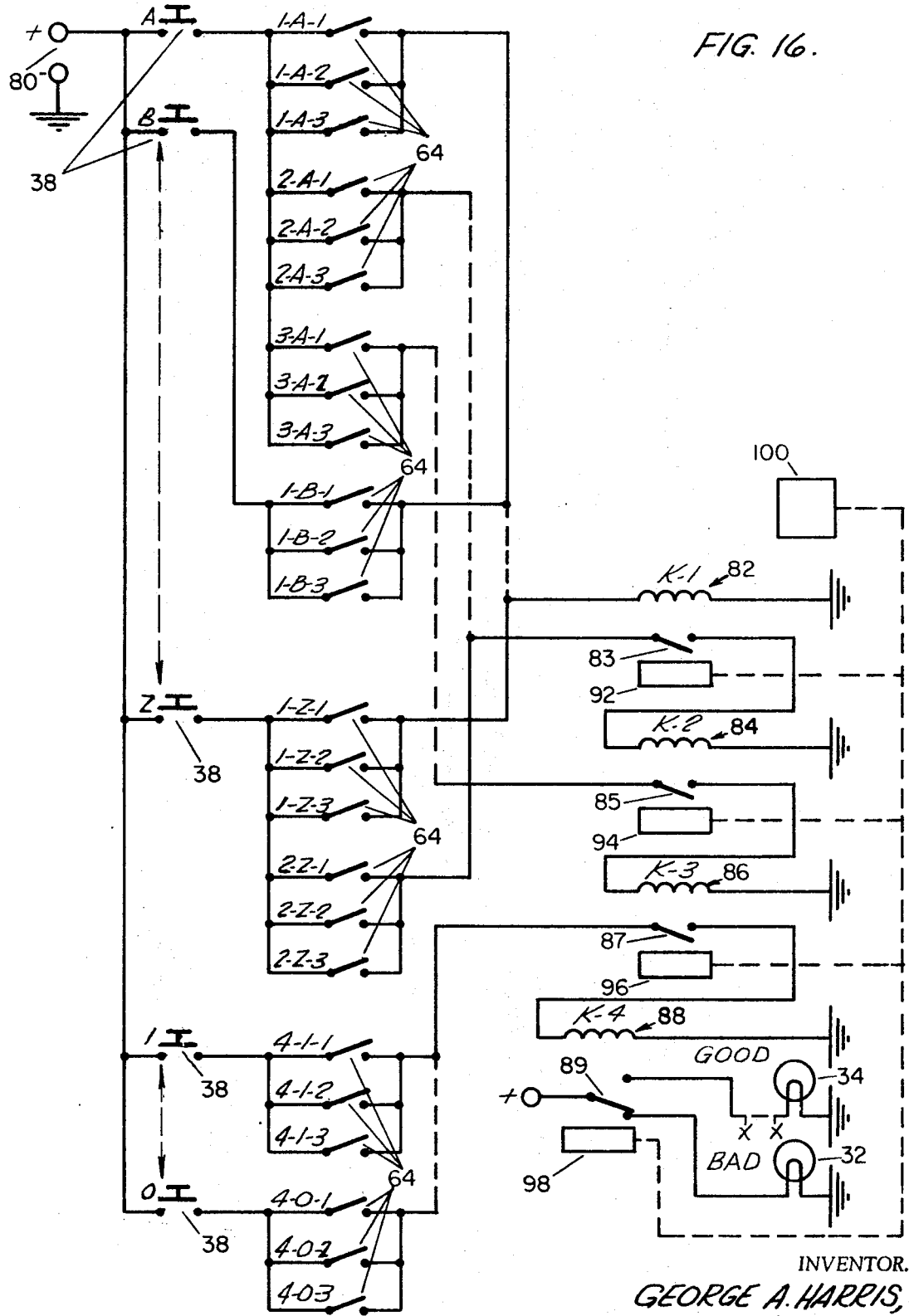
FIG. 16 is a detailed schematic diagram similar to that of FIG. 14, showing an alternative construction for holding the code group relays closed.
Figure 17:
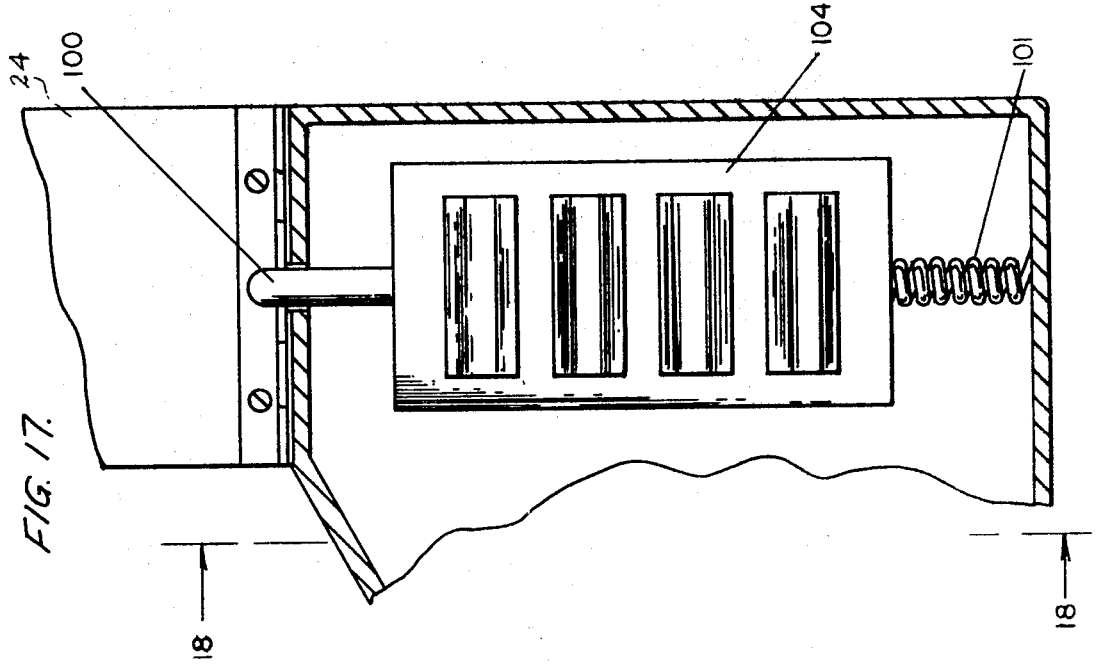
FIG. 17 is an enlarged, plan view of the code group relays used with the system illustrated in FIG. 16.

The reader of FIG. 16 is the same as that of FIG. 14 except that holding magnets 92, 94, 96 and 98 are substituted for holding coils H-1, H-2, H-3 and H-4, respectively and the switches are of the magnetic reed type. The magnets are permanent magnets and have such strength that they bias their associated magnetic reed switches toward closing but do not close them. Once the magnetic reed switch has been closed due to a flow of current in the relay coil, the magnet holds the switch closed.

Figure 18:
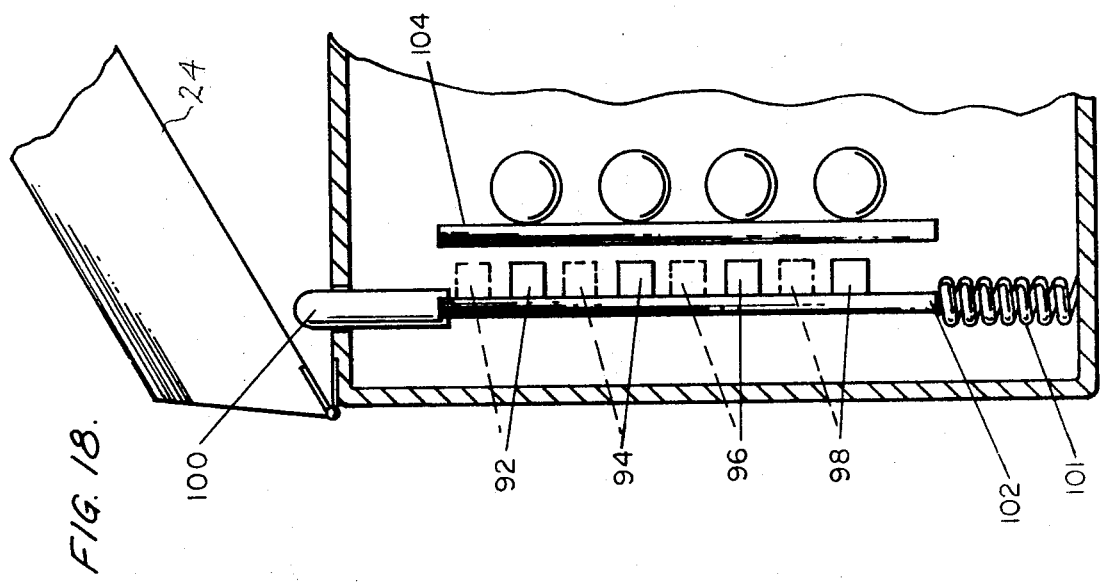
FIG. 18 is an elevational view, viewed in the direction of the arrows 18 of FIG. 17.

The switches are released by opening the cover which permits reset button 100 to rise due to the action of resiliently biased spring 101. The magnets are in the positions shown by the dotted lines of FIG. 18 when the cover 24 is open and in the positions shown by the solid lines when the cover 24 is closed. The relay coils and magnetic reed switches are mounted on board 104 and the magnets are mounted on board 102 which moves vertically downward when the cover is closed and vertically upward when the cover is opened.

In the down position (with the cover closed) the relay switches, which have been closed by correct code authentication, are held closed. When the cover is opened, all relay switches, which were closed, are opened and keyboard coding can be started again after the cover is closed.

It is also within the contemplation of the invention to substitute the magnets of FIG. 16 for the holding coils of FIG. 15 for the authenticating of cards whose code is carried by holes or depressions.

While particular embodiments of the invention have been shown and described, it is apparent to those skilled in the art that modifications are possible without departing from the spirit and scope of the invention.

The embodiments of the invention in which I claim an exclusive property or privilege are as follows:

1. A system for authenticating credit cards comprising:
   a card having irregularities thereon constituting identifying codes in a plurality of possible code groups;
   a reader having a slot to receive the card and containing therein;
   a plurality of switches and a plurality of sensing means associated therewith to sense said irregularities to identify the code on the card such that one of the sensing means actuates its associated switch when an irregularity in the card is sensed;
   a plurality of separate switches associated with said reader so as to be capable of being actuated separately;
   a source of voltage;
   a plurality of relays, there being one associated with each possible code group, each of the relays having a coil and a switch actuated by the coil;
   portions of the pluralities of switches and of hand-actuated switches being associated with each of the possible code groups and connected so that there is a switch associated with each hand-actuated switch;
   the associated switches and hand-actuated switches of each possible code group being separately connected in series with the relay coil of that code group and the source of voltage such that when the associated switch and hand-actuated switch are closed; the relay switch actuated by the coil is closed;
   the switch of the relay of a code group being in series with the relay coil of the next following code group such that the relay of the next following code group will not be actuated if the switch of the previous relay is not closed;

indicating means displaying authentication if all the switches of the relays close and nonauthentication if they do not close.

2. The invention of claim 1 wherein each of the relays is provided with a second coil connected across the source of voltage such that the relay switch is biased toward closing but is not closed until the coil is connected to the source of voltage, the second coil holding the relay switch closed once the said switch is closed and including means to disconnect the second coils from the source of voltage to thereby open the closed relay switches.

3. The invention of claim 1 wherein the relays are of the magnetic reed type and including a magnet associated with each relay and movable from a first position in which the reed is biased toward closing to a second position in which the reed is unbiased, the magnet in the first position holding the relay switch closed once it is closed.

4. The invention of claim 1, wherein a motor is connected to the source of voltage such that when all the relays close, the motor is actuated to imprint an invoice from the credit card.